(12) United States Patent
Karner

(10) Patent No.: US 7,537,793 B1
(45) Date of Patent: May 26, 2009

(54) SYSTEM FOR DEPOSITING FOOD PRODUCTS ON OTHER FOOD PRODUCTS

(76) Inventor: James E. Karner, 8130 Berry Ave., Suite 100, Sacramento, CA (US) 95828

( * ) Notice: Subject to any disclaimer, the term of this patent is extended or adjusted under 35 U.S.C. 154(b) by 1120 days.

(21) Appl. No.: 10/849,598

(22) Filed: May 20, 2004

Related U.S. Application Data

(60) Provisional application No. 60/477,527, filed on Jun. 10, 2003.

(51) Int. Cl.
*A21D 6/00* (2006.01)
*A23L 1/00* (2006.01)

(52) U.S. Cl. .................... 426/502; 426/512; 426/138; 426/297

(58) Field of Classification Search ............... 99/450.6, 99/450.7, 450.1, 325, 349, 468, 486; 426/502, 426/512, 516, 517, 138, 283, 297
See application file for complete search history.

(56) References Cited

U.S. PATENT DOCUMENTS

| | | |
|---|---|---|
| 3,757,676 A | 9/1973 | Pomara |
| 3,858,497 A | 1/1975 | Ishida |
| 3,901,137 A | 8/1975 | Jimenez |
| 3,946,656 A | 3/1976 | Hai |
| 4,014,254 A | 3/1977 | Ohkawa |
| 4,047,478 A | 9/1977 | Trostmann |
| 4,084,493 A | 4/1978 | Quintana |
| 4,112,834 A | 9/1978 | Thiry |
| 4,334,464 A | 6/1982 | Shinriki |
| 4,388,059 A | 6/1983 | Ma |
| 4,439,124 A | 3/1984 | Watanabe |
| 4,457,225 A | 7/1984 | Bakker |
| 4,483,242 A | 11/1984 | Goodman et al. |
| 4,516,487 A | 5/1985 | Madison et al. |
| 4,517,785 A | 5/1985 | Masuda |
| 4,608,919 A | 9/1986 | Prows et al. |
| 4,637,304 A | 1/1987 | Suzuki |
| 4,691,627 A | 9/1987 | Roberts |
| 4,719,117 A | 1/1988 | Simelunus |
| 4,913,043 A | 4/1990 | Cheung |
| 4,953,455 A | 9/1990 | Figueras |
| 5,101,957 A | 4/1992 | Schiek |
| 5,281,427 A | 1/1994 | Rahim |
| 5,328,709 A | 7/1994 | Larsen |
| 5,330,776 A | 7/1994 | Wikstroem |
| 5,456,298 A | 10/1995 | Tennis |
| 5,509,350 A | 4/1996 | Askman et al. |
| 5,814,360 A | 9/1998 | McDilda et al. |
| 5,832,813 A | 11/1998 | Shimazu |
| 5,912,035 A | 6/1999 | Grat |
| 6,263,789 B1 | 7/2001 | Karner |
| 6,303,165 B1 | 10/2001 | Karner |
| 6,558,720 B1 | 5/2003 | Karner |

FOREIGN PATENT DOCUMENTS

GB 2223391 A 11/2004

*Primary Examiner*—Reginald L Alexander
(74) *Attorney, Agent, or Firm*—Thomas R. Lampe

(57) ABSTRACT

A first edible food product of predetermined length is received by an intermittently movable upper conveyor having an effective length the same as said predetermined length. A lower conveyor continuously transports second edible food products and a sensor senses when each of the second edible food products reaches a predetermined location. A controller receives a signal from the sensor and causes simultaneous movement of the upper conveyor to deposit the supported first edible food product and activation of equipment to place a replacement first edible food product on the upper conveyor.

2 Claims, 1 Drawing Sheet

SYSTEM FOR DEPOSITING FOOD PRODUCTS ON OTHER FOOD PRODUCTS

This application is based on and claims the benefit of U.S. Provisional Patent Application No. 60/477,527, filed on Jun. 10, 2003.

TECHNICAL FIELD

A method and apparatus for depositing first edible food products, such as fillings, on second edible food products, for example egg rolls, spring rolls, bread, cake, pastry, pizza, wraps or shells.

BACKGROUND OF THE INVENTION

Hand-held food products have been a regular part of the culture of man in every region of the world for thousands of years. From the egg rolls of China, burritos and enchiladas of Mexico and pizzas of the Greeks in 400 B.C., the popularity and consumption of these favorites has increased at a steady rate.

Traditional products have been assembled by hand. Food products have been hand placed on a wrap or shell and folded or rolled one at a time. In the modern factory production environment these practices have resulted in repetitive motion injuries to workers and significant workers compensation and medical expenses for employers.

With the advent of automated assembly equipment and food freezers, the need has developed to deposit food products onto wraps and shells at high rates of speed. Simple gravity depositors are suitable for low rates under 30 per minute. As assembly rates reach and exceed 250 per minute other means must be employed.

Complex methods and machines such as shown in U.S. Pat. Nos. 6,263,789, 6,303,135 and 6,558,720 have been employed to deposit food products onto wraps and shells. These have included numerous sensors for filling, encoders, and master controllers. Food products are extruded and then forced to undergo extreme changes in motor speed, even reversing direction, in response to position sensor inputs to master controllers. The radical changes in velocity and direction drastically limit the type of food products and require the product to be modified by temperature and pressure to form compressed chilled portions that can accept the physical forces imposed by methods and mechanisms of prior art.

It is an object of the present invention to eliminate the need for filling sensors. Positioned in close proximity to the filling, such sensors are costly and prone to interruption in operation due to deposits of the filling material they are intended to sense blocking the photoeyes. The blockage of the photoeyes leads to uncontrolled portions of food product and unacceptable deposit position. This creates rejected product and incurs downtime to identify and correct the source of the system malfunction. Meat product depositing equipment must be intensely cleaned. Washing with chemical solutions and high pressure sprays can easily damage sensitive photoeye components resulting in improper system operation, rejected product waste, and downtime to repair.

It is another object of this invention to eliminate the requirement for encoders, data medium, and controllers to monitor the position of wraps or shells and the position of food product segments. Prior art has utilized encoders to generate digital position information representing the location of shells, data medium to store the digital data and master controllers to calculate and direct conveyor motors to execute motion profiles to correct the position of filling segments that would otherwise be misplaced from the proper relationship to the shell. The encoders are complex electro-mechanical devices with a rotating shaft coupled to a moving belt with gears, belts or chains. The shaft seal is an entry point for high pressure water and corrosive chemicals in a meat production washdown equipment environment. Connectors on cables used to transmit encoder pulse information often corrode in a washdown environment and are costly and time consuming to replace. The master controllers receiving the encoders must be located in close proximity to the encoders and therefore electronic components and circuit boards are subjected to destructive humidity and chemical vapors, must be protected from the wash water sprays and the resulting sealed enclosures require air conditioning to remove the heat generated by the controllers which would otherwise destroy themselves.

By designing the effective length of the food product conveyor to equal the length of the food portion as taught by the present invention, there is no need for employment of correction distance such as that utilized in U.S. Pat. No. 6,263,789. According to the present invention, the new or replacement first edible food portion is placed directly behind the first edible food portion in process. As the portion in process leaves the food product conveyor, the new or replacement food portion is placed on the food product conveyor which then turns off until the next wrapper, shell or other second edible food portion is in position. By eliminating the correction distance, the portions of food product can be placed directly behind one another. This assures that any lack of space between the wraps or shells has no effect on the ability of the apparatus to properly deposit the food product. Prior art has used the correction distance method. This method cannot deposit on shells spaced closer than the fixed minimum distance required to correct the position of a filling segment as it travels towards the shell. This inability to deposit on directly adjacent shells results in the rejection and waste of the wrap and shell products.

Another object is to reduce or eliminate the damage to the first edible food product caused by relative motion. Relative motion is the differential velocity of the food product being pumped or otherwise deposited and the food product conveyor belt. This damage is most extreme when the blade of the food product cutter is operated or the food product pump stops after delivering its portion. In U.S. Pat. No. 6,263,789, the segment of food product is placed on the conveyor while the conveyor is in motion. When the cutter is operated, the food portion velocity goes to 0 fpm while the conveyor belt travels at full speed beneath the portion. Some specially formulated food products such as chilled shredded beef or chicken, compressed with the proper sauce to glue the filling segment together, can tolerate having the segment end stuck in a cutter blade while the belt slides underneath. Other common food products such as ground beef, vegetables, fruit, or mixtures of common burrito fillings such as eggs, beans, chopped vegetables and meat, break up and scatter across the food product belt, rendering the system of U.S. Pat. No. 6,263,789 completely unable to portion or position the food product. This factor establishes a small limited and closely defined range of food products that can be successfully deposited with this method.

The following patents and other patent documents are also known: U.S. Pat. No. 3,757,676, U.S. Pat. No. 3,858,497, U.S. Pat. No. 3,901,137, U.S. Pat. No. 3,946,656, U.S. Pat. No. 4,014,254, U.S. Pat. No. 4,047,478, U.S. Pat. No. 4,084,493, U.S. Pat. No. 4,112,834, U.S. Pat. No. 4,334,464, U.S. Pat. No. 4,388,059, U.S. Pat. No. 4,439,124, U.S. Pat. No. 4,457,225, U.S. Pat. No. 4,483,242, U.S. Pat. No. 4,516,487, U.S. Pat. No. 4,517,785, U.S. Pat. No. 4,608,919, U.S. Pat.

No. 4,637,304, U.S. Pat. No. 4,691,627, U.S. Pat. No. 4,719,117, U.S. Pat. No. 4,913,043, U.S. Pat. No. 4,953,455, U.S. Pat. No. 5,101,957, U.S. Pat. No. 5,328,709, U.S. Pat. No. 5,330,776, U.S. Pat. No. 5,456,298, U.S. Pat. No. 5,509,350, U.S. Pat. No. 5,832,813, U.S. Pat. No. 5,912,035, U.S. Pat. No. 5,281,427, U.S. Pat. No. 5,814,360, U.S. Pat. No. 6,263,789, U.S. Pat. No. 6,303,165, U.S. Pat. No. 6,558,720, and Great Britain Patent document 2223391A.

DISCLOSURE OF INVENTION

The apparatus of the present invention is for serially depositing first edible food products on second edible food products. The apparatus includes equipment for serially making available the first edible food products.

An intermittently movable upper conveyor is incorporated in the apparatus for receiving said first edible food products one at a time from said equipment and supporting said first edible food products one at a time.

A lower conveyor continuously transports the second edible food products.

A sensor is provided for sensing when each of said second edible food products being continuously transported by said lower conveyor reaches a predetermined location.

A controller is operatively associated with the sensor, the equipment and the upper conveyor to (1) initiate movement of the upper conveyor from a stopped condition to transport a first edible food product supported thereby and place the transported first edible food product on the second edible food product sensed at said predetermined location by the sensor during continuous transport thereof and (2) substantially simultaneously cause the equipment to place a replacement first edible food product on the upper conveyor.

The invention also encompasses a method for serially depositing first edible food products on second edible food products.

The method includes serially making available the first edible food products and placing the first edible food products one at a time on an intermittently movable upper conveyor.

A lower conveyor is employed to continuously transport the second edible food products.

The method includes the step of sensing when each of the second edible food products continuously transported by the lower conveyor reaches a predetermined location and the step of substantially simultaneously initiating movement of the upper conveyor from a stopped condition to transport a first edible food product supported thereby and place the transported first edible food product on the second edible food product sensed at the predetermined location by the sensor during continuously transport thereof and placing a replacement first edible food product on the upper conveyor.

Other features, advantages and objects of the present invention will become apparent with reference to the following description and accompanying drawings.

BEST MODE FOR CARRYING OUT THE INVENTION

Figure 1:
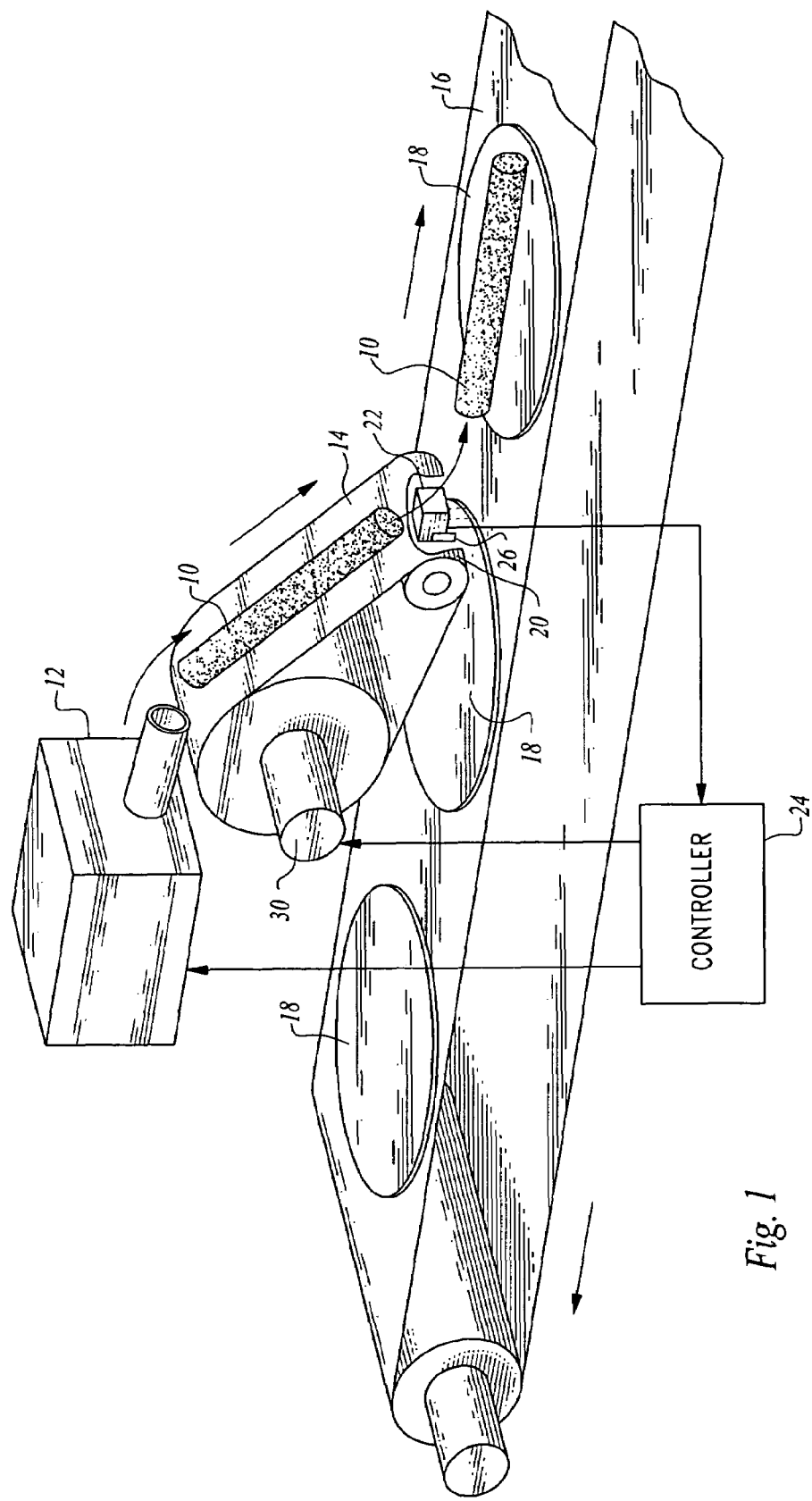
FIG. 1 is a block diagram illustrating components of apparatus constructed in accordance with the teachings of the present invention.

Referring now to FIG. 1, apparatus constructed in accordance with the teachings of the present invention is illustrated.

The apparatus is for serially depositing first edible food products on second edible food products. In the disclosed embodiment, the first edible food product 10 is produced or made available by a food product pump 12 which may be of any suitable commercially available type. The food product pump or equipment 12 serially makes available a plurality of the first edible food products, the latter for example being ground meat, vegetables or other material lending itself to utilization of the present invention. The first edible food products 10 produced by equipment 12 are of substantially the same length and must be so when carrying out the teachings of the present invention.

Positioned downstream from the food product pump 12 is an intermittently movable belt-type upper conveyor 14 for receiving first edible food products 10 from equipment 12 one at a time, the intermittently movable upper conveyor 14 supporting one first edible food product at a time. The effective length of the upper conveyor 14 is the same as the length of each first edible food product. The upper conveyor is motor driven.

The apparatus also includes a lower conveyor 16 for continuously transporting second edible food products 18 which may for example be edible shells or wraps. The lower conveyor operates continuously and passes under the discharge end 20 of upper conveyor 14. The space between the discharge end 20 and the lower conveyor is sufficient to allow passage of second edible food products 18 therebetween.

A photoelectric sensor or other type of sensor 22 senses when the leading edge of each of the second edible food products 18 reaches a predetermined location and immediately sends a signal to a suitably programmed controller 24. Sensor 24 is preferably mounted on a bracket 26 allowing placement of the sensor to be changed.

Controller 24 is in the operative relationship with food product pump 12 and the electric motor 30 driving upper conveyor 14. When the controller receives the sensor signal, the controller initiates movement of the upper conveyor from a stopped condition by energizing the motor thereof to transport a first edible food product 10 supported thereby and place the transported first edible food product on the second edible food product 18 sensed at the aforesaid predetermined location by the sensor during continuous transport thereof. Simultaneously, the controller causes the equipment 12 to place a replacement edible food product 10 on the upper conveyor.

The controller is operable to stop movement of the upper conveyor by deenergizing the motor thereof after the transported first edible food product on the upper conveyor leaves discharge end 20 and is placed on the second edible food product sensed at the predetermined location by the sensor and the food product pump has placed the replacement first edible food product on the upper conveyor. The controller is operable to terminate operation of the equipment 12 after the equipment has placed the replacement first edible food product on the upper conveyor.

As indicated above, the present invention also encompasses a method for serially depositing first edible food products on second edible food products. The method includes the step of serially making available the first edible food products 10 and placing the first edible food products 10 one at a time on intermittently movable upper conveyor 14.

Lower conveyor 16 is employed to continuously transport the second edible food products 18. The method includes sensing when each of the second edible food products continuously transported by the lower conveyor reaches a predetermined location.

Also included in the method is the step of substantially simultaneously initiating movement of the upper conveyor from a stopped condition to transport a first edible food product supported thereby and place the transported first edible food product on the second edible food product sensed at the predetermined location by the sensor 22 during continuous transport thereof and placing a replacement first edible food product on the upper conveyor. The first edible food products 10 are made available at the same length as the effective length of the upper conveyor. The method also includes the step of stopping movement of the upper conveyor after the upper conveyor has placed the transported first edible food product on the second edible food product sensed at the predetermined location by the sensor and the replacement first edible food product has been placed on the upper conveyor.

According to the method, the upper conveyor is moved during each period of movement during the intermittent movement thereof a distance equal to the effective length thereof and the length of the first edible food product supported thereby. Because the present arrangement results in a first edible food product always waiting for the intended shell, wrap or other second edible food product, the minimum spacing required by known methods is eliminated. The main bed of the upper conveyor and the belt thereof are easily interchanged with longer or shorter assemblies to accommodate different length products.

The perfected relationship of the dimensions of the apparatus to the shell, wrap or other second edible food product to be operated upon eliminates the necessity for the electronic control elements to correct otherwise imperfect mechanical design elements. The need for electronic motor speed adjustments is eliminated by the design of the depositor elements in a proper relationship to the shell or wrap and the filling or other type of first edible food product.

While electronic control systems have been employed in the past to modify the position and velocity profile parameters of edible food products being combined, these methods are complex, costly and prone to unpredictable failure. By embedding the deposit parameters in the physical relationship of the mechanical components as taught by this invention, it becomes the nature of the apparatus to perform the task for which it was designed in a highly efficient, reliable and speedy manner.

The invention claimed is:

1. A method for serially depositing first edible food products on second edible food products, said method including the steps of:
    utilizing equipment to serially make available said first edible food products, said first edible food products being of substantially the same length;
    placing each of said first edible food products one at a time on an electric motor driven, intermittently movable upper conveyor, said upper conveyor having a discharge end and an effective length between said equipment and said discharge end substantially equal to the length of each of said first edible food products;
    employing a continuously operating lower conveyor to continuously transport said second edible food products;
    sensing with a sensor when each of said second edible food products continuously transported by said lower conveyor reaches a predetermined location; and
    employing a controller operatively associated with said sensor to substantially simultaneously initiate movement of said upper conveyor from a stopped condition to transport a first edible food product supported thereby and place the transported first edible food product on the second edible food product sensed at said predetermined location by said sensor during continuous transport thereof and causing said equipment to place a replacement first edible food product on said upper conveyor directly behind and immediately adjacent to said transported first edible food product, said controller initiating movement of said upper conveyor by energizing said electric motor and stopping movement of said upper conveyor by deenergizing said electric motor, said upper conveyor being intermittently moved a distance substantially equal to the effective length thereof and the length of the first edible food product supported thereby.

2. The method according to claim 1 including the step of temporarily stopping movement of said upper conveyor after the intermittently movable upper conveyor has placed the transported first edible food product on the second edible foot product sensed at said predetermined location by said sensor and said equipment has presented said replacement first edible food product on said upper conveyor.

* * * * *